(12) United States Patent
Hensleigh et al.

(10) Patent No.: US 11,072,160 B2
(45) Date of Patent: Jul. 27, 2021

(54) SYSTEM AND METHOD FOR STIMULATED EMISSION DEPLETION PROJECTION STEREOLITHOGRAPHY

(71) Applicants: Ryan Hensleigh, Colstrip, MT (US); Bryan D. Moran, Pleasanton, CA (US); Julie A. Jackson, Livermore, CA (US); Eric Duoss, Dublin, CA (US); Brett Kelly, Berkeley, CA (US); Maxim Shusteff, Oakland, CA (US); Hayden Taylor, Berkeley (CA); Christopher Spadaccini, Oakland, CA (US)

(72) Inventors: Ryan Hensleigh, Colstrip, MT (US); Bryan D. Moran, Pleasanton, CA (US); Julie A. Jackson, Livermore, CA (US); Eric Duoss, Dublin, CA (US); Brett Kelly, Berkeley, CA (US); Maxim Shusteff, Oakland, CA (US); Hayden Taylor, Berkeley (CA); Christopher Spadaccini, Oakland, CA (US)

(73) Assignees: Lawrence Livermore National Security, LLC, Livermore, CA (US); The Regents Of The University Of California, Oakland, CA (US)

( * ) Notice: Subject to any disclaimer, the term of this patent is extended or adjusted under 35 U.S.C. 154(b) by 198 days.

(21) Appl. No.: 15/244,605

(22) Filed: Aug. 23, 2016

(65) Prior Publication Data
US 2018/0056603 A1 Mar. 1, 2018

(51) Int. Cl.
*B33Y 30/00* (2015.01)
*B33Y 10/00* (2015.01)
(Continued)

(52) U.S. Cl.
CPC ............ *B33Y 30/00* (2014.12); *B29C 64/129* (2017.08); *B29C 64/135* (2017.08); *B33Y 10/00* (2014.12)

(58) Field of Classification Search
CPC ... B29C 64/129; B29C 67/0066; B33Y 10/00; B33Y 30/00; G21K 5/00
(Continued)

(56) References Cited

U.S. PATENT DOCUMENTS

| 8,432,533 B2 | 4/2013 | Fourkas et al. | |
| 2005/0259785 A1* | 11/2005 | Zhang | G03F 7/0037 378/34 |
| 2018/0015661 A1* | 1/2018 | Xu | B29C 64/129 |

OTHER PUBLICATIONS

Zheng, Xiaoyu, et al. "Design and optimization of a light-emitting diode projection micro-stereolithography three-dimensional manufacturing system." Review of Scientific Instruments 83, No. 12, 2012, 125001-1, 7 pages.
(Continued)

*Primary Examiner* — Matthew J Daniels
*Assistant Examiner* — Yunju Kim
(74) *Attorney, Agent, or Firm* — Harness, Dickey & Pierce, P.L.C.

(57) ABSTRACT

The present disclosure relates to a system for forming a three dimensional (3D) part. The system may incorporate a beam delivery subsystem for generating optical signals, and a mask subsystem that receives the optical signals and generates optical images therefrom. A first one of the optical images activates a polymerization species of a photo-sensitive resin in accordance with illuminated areas thereof, to thus cause polymerization of select portions of the photo-sensitive resin to help form a layer of the 3D part. A second one of the optical images causes stimulated emission depletion of subportions of the polymerization species, simulta-
(Continued)

neously, over various areas of the layer, to enhance resolution of at least one subportion of the select portions of the photo-sensitive resin.

8 Claims, 4 Drawing Sheets

(51) Int. Cl.
*B29C 64/129* (2017.01)
*B29C 64/135* (2017.01)

(58) Field of Classification Search
USPC .......................................... 425/174.4; 378/34
See application file for complete search history.

(56) References Cited

OTHER PUBLICATIONS

Fischer, Joachim, et al. "Exploring the Mechanisms in STED-Enhanced Direct Laser Writing." Advanced Optical Materials, 2014, 12 pages.
Engstrom, Daniel S., et al. "Additive nanomanufacturing—A review." Journal of Materials Research, 29 (17), Sep. 14, 2014, 27 pages.

\* cited by examiner

SYSTEM AND METHOD FOR STIMULATED EMISSION DEPLETION PROJECTION STEREOLITHOGRAPHY

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods involving additive manufacturing, and more particularly to systems and methods involving stimulated emission depletion used in connection with projection microstereolithography to form a three dimensional part.

BACKGROUND

This section provides background information related to the present disclosure which is not necessarily prior art.

Photolithography techniques are continually driving for finer features over larger volumes. Traditionally, following the typically Abbe diffraction limit, smaller wavelengths have been used in order to decrease features size. These lower wavelengths predicate specialized materials and safety precautions for their use limiting their wider applicability. Alternatively, non-linear photochemical processes may be used in order to circumvent the Abbe diffraction limit and achieve smaller features. Exploring the Mechanisms in STED-Enhanced Direct Laser Writing, Fischer, et al., describes the background science whereby stimulated emission of a secondary beam is used to deplete the lifetime and propagation of primary beam excited polymerization initiating species in a photoresist.

*Additive Nanomanufacturing—A Review*, Egnstrom et al., gives a broad background of additive nano-manufacturing with examples of features and structures which have been achieved.

*Design And Optimization Of A Light-Emitting Diode Projection Micro-Stereolithography Three-Dimensional Manufacturing System*, Zheng et al., describes a projection stereolithography technique for micron scale features using a spatial light modulator and photosensitive resin.

SUMMARY

This section provides a general summary of the disclosure, and is not a comprehensive disclosure of its full scope or all of its features.

In one aspect the present disclosure relates to a system for forming a three dimensional (3D) part. The system may comprise a beam delivery subsystem for generating optical signals, and a mask subsystem configured to receive the optical signals and to generate optical images therefrom. At least a first one of the optical images enables activation of a polymerization species of a photo-sensitive resin in accordance with illuminated areas thereof, to thus cause polymerization of select portions of the photo-sensitive resin to help form a layer of the 3D part. At least a second one of the optical images enables stimulated emission depletion of subportions of the polymerization species, simultaneously, over various areas of the layer, to enhance resolution of at least one subportion of the select subportions of the photo-sensitive resin.

In another aspect the present disclosure relates to a system for forming a three dimensional (3D) part. The system may comprise a 3D model, a beam delivery subsystem and a mask subsystem. The beam delivery subsystem may be used for generating first and second optical signals. The mask subsystem may be configured to receive the first and second optical signals and the 3D model, and to generate from the 3D model and the first optical signal a primary 2D image. The primary 2D image causes activation of a polymerization species of a photo-sensitive resin in accordance with illuminated areas of the primary 2D image, which causes polymerization of select portions of the photo-sensitive resin to initiate formation of a first layer of the 3D part. The mask subsystem is further configured to receive the secondary optical signal and to generate therefrom a secondary 2D image. The secondary 2D image initiates stimulated emission depletion of subportions of the polymerization species, simultaneously, over at least portions of the first layer, in accordance with illuminated portions of the secondary 2D image, to enhance resolution of one or more select portions of the photo-sensitive resin.

In still another aspect the present disclosure relates to a method for forming a three dimensional (3D) part. The method may comprise using a beam delivery subsystem to generate optical signals, and using a mask subsystem configured to receive the optical signals and to generate optical images therefrom. The method may further involve using at least a first one of the optical images to cause activation of a polymerization species of a photo-sensitive resin in accordance with illuminated areas thereof, to thus cause polymerization of select portions of the photo-sensitive resin to help form a layer of the 3D part. The method may further involve using at least a second one of the optical images to cause stimulated emission depletion of subportions of the polymerization species, simultaneously, over various areas of the layer, to enhance resolution of at least one subportion of the select portions of the photo-sensitive resin.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure involves a system and method which utilizes stimulated emission depletion (STED) in order to depopulate the excited polymerizing species via stimulated emission, in order to control their propagation and enhance the resolution of projection microstereolithography (PuSL) 3D manufacturing. Typical PuSL utilizes projection by a spatial light modulator to create a 2D image of light from a primary beam which is optically guided onto a photosensitive resin. Where light penetrates the resin, polymerization species become activated and initiate crosslinking to form a solid. The polymerizing species lifetime allows them to diffuse beyond the projected image causing increasing part size, thus detracting from the resolution of various features of the resulting 3D part.

Figure 1:
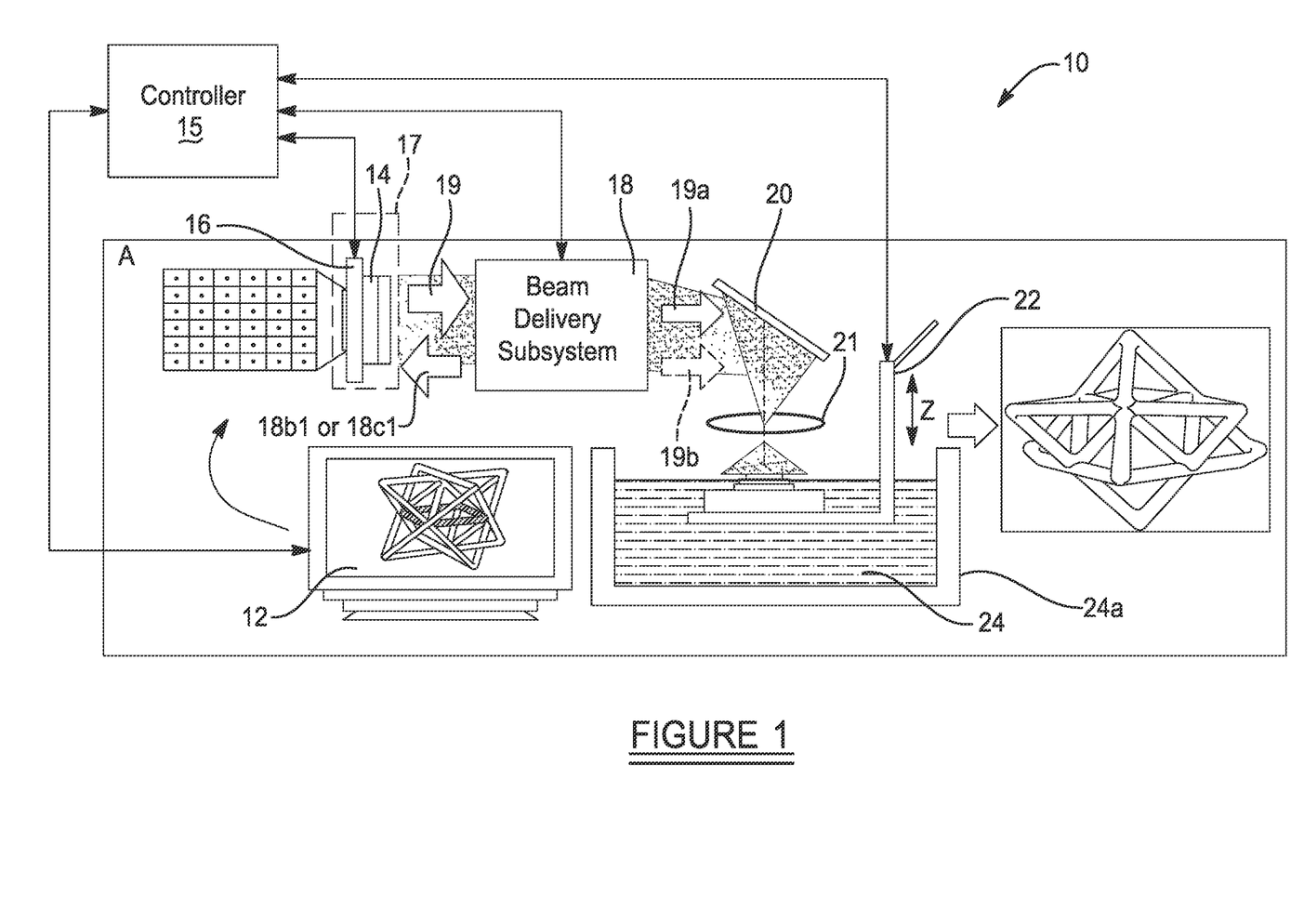
FIG. 1 is a high level drawing of one embodiment of a system in accordance with the present disclosure which uses stimulated emission depletion, in connection with projection microstereolithography, to create a 3D part having significantly improved feature resolution, in a layer-by-layer process, from a series of successively generated 2D images.

FIG. 1 depicts a typical PuSL system 10 in accordance with one embodiment of the present disclosure. The system 10 makes use of a 3D CAD modeling system 12 which supplies a 3D model of a part to an electronic controller 15. The controller 15 may be used to help control a mask subsystem 17, which in this example includes a digital mask (hereinafter "digital mask 16"), as well as a spatial light modulator 14. The controller 15 may be independent of the mask subsystem 17 or it may form an integrated portion of the mask subsystem.

The digital mask 16 includes a large plurality of individually electronically addressable pixels, and signals generated by the controller 15, generated from the input received from the 3D CAD modeling system 12, control which ones of its pixels are illuminated. A beam delivery subsystem 18 provides either a primary 2D optical signal or a secondary 2D optical signal, which illuminates the digital mask 16. The use of the primary and secondary 2D optical signals will be described further in connection with the discussion of FIG. 1a. The spatial light module 14 may be controlled by the controller 15 or by a separate, fully independent controller, but in either event modulates light 19 received by the beam delivery subsystem 18 to help form the primary and secondary 2D images 19a and 19b, respectively.

Figure 1A:
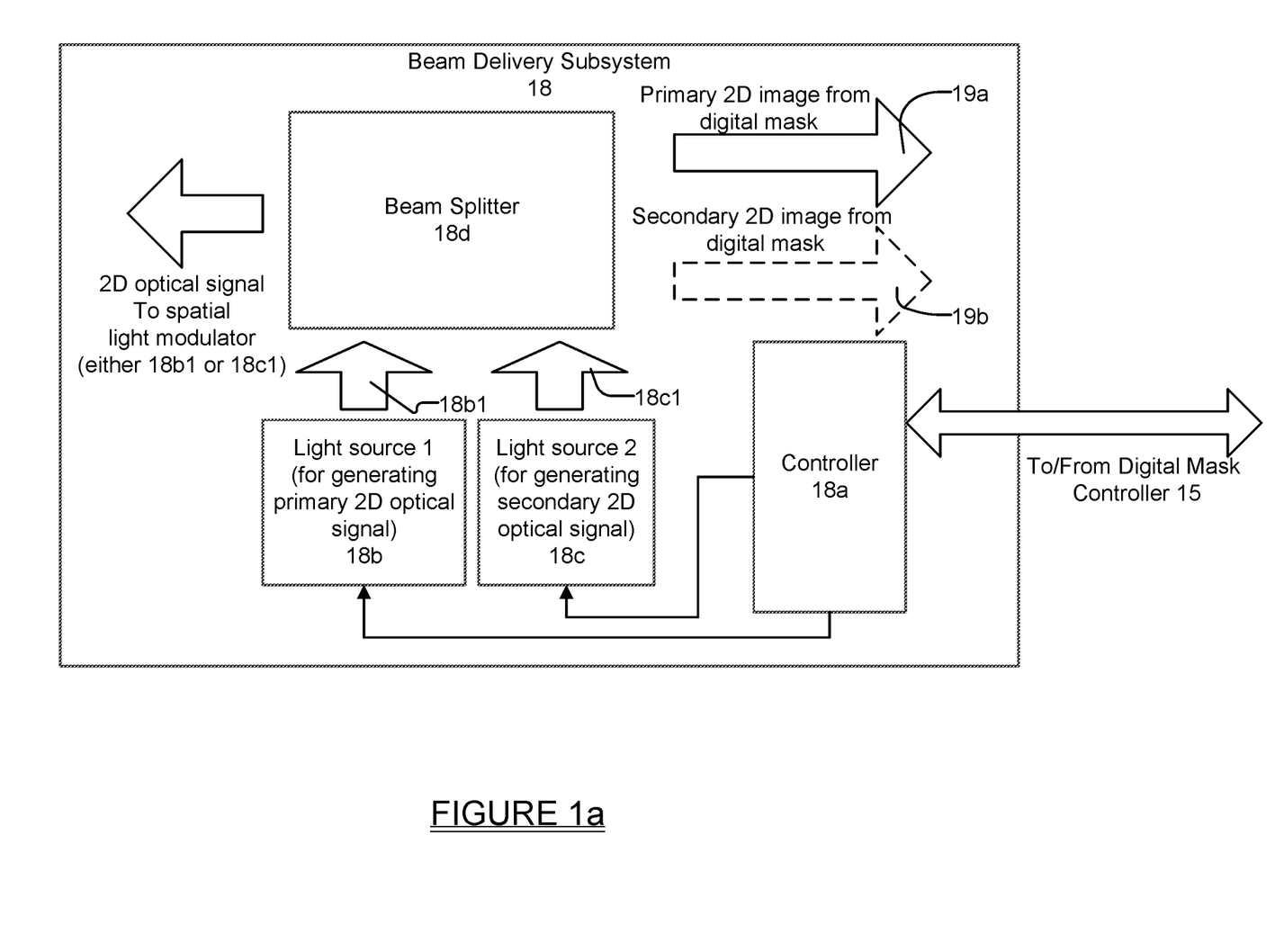
FIG. 1a is a high level drawing showing various components that may be included in the beam delivery subsystem shown in FIG. 1.

With brief reference to FIG. 1a, one embodiment of the beam delivery subsystem 18 is shown in greater detail. The beam delivery subsystem 18 may include an electronic controller 18a, a first light source 18b for generating the primary 2D optical signal 18b1 used to form the primary 2D image 19a, and a second light source 18c for generating the secondary 2D optical signal 18c1 used to help form the secondary 2D image 19b. The first and second light sources 18b and 18c may be controlled independently by the controller 18a. A beam splitter 18d may be used to direct the generated optical signal (i.e., either the primary or secondary 2D optical signal 18b1 or 18c1, respectively) to the digital mask 16. The digital mask 16 and the spatial light module 14 operate together to create a 2D image using the received optical signal, which will form either the primary 2D image 19a or the secondary 2D image 19b. The beam splitter 18d also enables the optical signals representing the primary and secondary 2D images 19a, 19b from the mask subsystem 17 to pass therethrough without obstruction. The controller 18a may communicate with, or be controlled by, the controller 15, as needed to alternately energize the light sources 18b and 18c at precise times to generate the primary and secondary 2D optical signals 18b1 and 18c1.

Referring further to FIG. 1, the 2D optical signal 18b1 or 18c1 received from the beam delivery subsystem 18 is used to create the 2D image 19a or 19b. The 2D images 19a and 19b are light images that pass through the beam splitter 18d of the beam delivery subsystem 18 and are optically directed via a mirror 20 and a projection lens 21 to an uppermost portion of a light curable, photo-sensitive resin 24 (hereinafter simply "photoresin 24") contained in a photoresin bath 24a. The projection lens 21 helps to size (i.e., reduce in scale) the 2D images 19a, 19b as needed so that the 2D images are in accordance with the desired length and width dimensions for the 3D part.

As the light of the primary 2D image 19a impinges the upper portion of the photoresin 24 it causes the polymerization species of the photoresin to become activated, thus causing polymerization of the upper portion of the photoresin 24 to begin. The polymerization essentially is hardening of selected upper surface portions of the photoresin 24 that are being illuminated by the UV light of the primary 2D image 19a.

The initial primary 2D image 19a is directed at the photoresin 24 for a certain time interval, which typically is between a few milliseconds up to one or more minutes, and more preferably between about 1-5 seconds. This begins the polymerization of a first layer of what will become a 3D part. When this time interval is complete, then the controller 18a of the beam delivery subsystem 18 interrupts operation of the primary light source 18b and turns on the secondary light source 18c. The secondary light source 18c is then used to help create a new secondary 2D image 19b. The new secondary 2D image 19b has a different wavelength from that used with the primary 2D image 19a. The new wavelength is selected to induce stimulated emission depletion of the polymerizing species, thus rapidly terminating polymerization. More particularly, the new secondary 2D image 19b being projected at the new wavelength acts on only specific portions of the polymerization species which was previously activated during projection of the initial primary 2D image 19a. The new secondary 2D image 19b may be projected for a few milliseconds up to a minute or more, and more preferably for about 1-5 ms. At the completion of this time interval the controller 15 may control the Z-stage elevator 22 so that the Z-stage elevator is lowered a predetermined distance into the photoresin bath 24a in preparation for formation of a new material layer. The new polymerized 2D material layer can now be formed on the just-completed 2D material layer. The alternating generation and application of the primary 2D image 19a and the secondary 2D image 19b allows each layer of the image to be formed without the need to raster scan separate optical signals back and forth across the photoresin bath 24a. As a result, a fully formed 3D part can be created much more rapidly and with enhanced resolution of its structural features than what would be possible with existing 3D PUSL and STED technology. When all of the required material layers are formed, the resulting structure is a 3D part having significantly improved feature resolution.

Figure 2A:
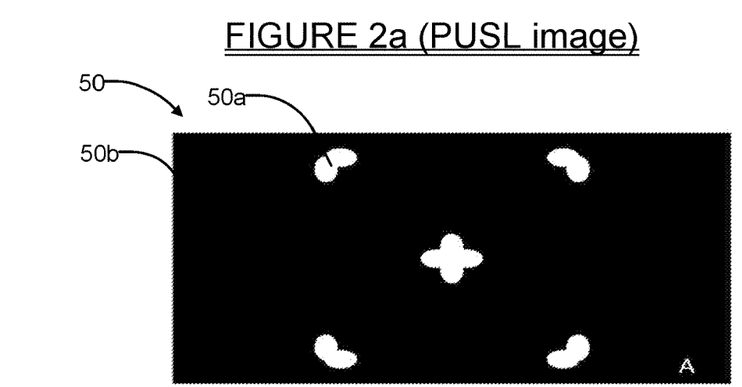
FIG. 2a is one example of an image created using projection microstereolithography, with the white portions of the image designating those portions of a 2D image that are illuminating the photoresin, and the black areas are those portions of the photoresin that are not being illuminated using the 2D image.
Figure 2B:
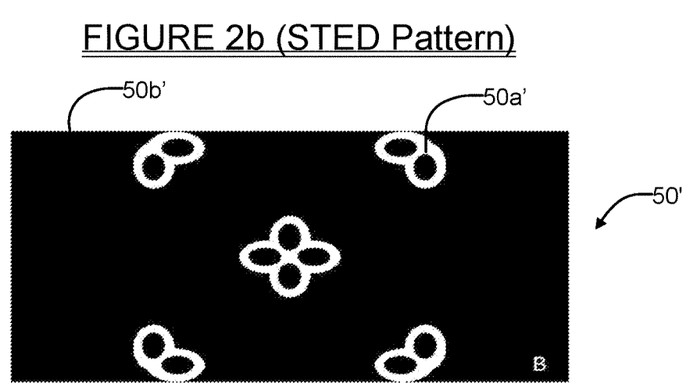
FIG. 2b is one example of an optical pattern in which an optical signal having a different frequency is selectively used to form a different 2D image, which is applied immediately after the 2D image shown in FIG. 2a, to cause stimulated emission depletion of the polymerization species and thus to stop the polymerization process, thus enhancing the resolution of details of the 2D material layer just formed.
Figure 3A:
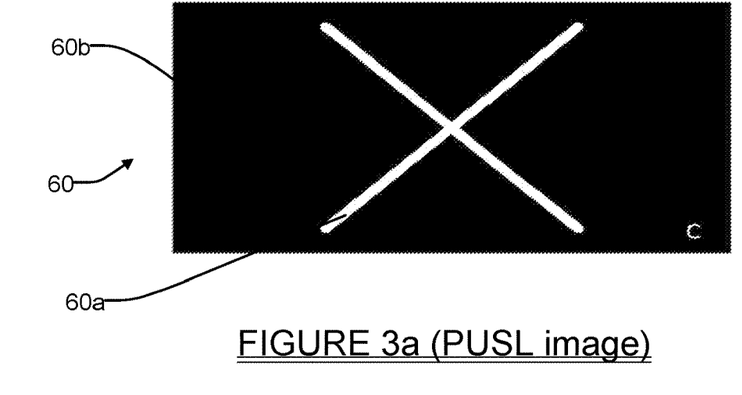
FIG. 3a is another example of an image created using projection microstereolithography, with the white portions of the image designating those portions of a 2D image that are illuminating the photoresin, and the black areas are those portions of the photoresin that are not being illuminated using the 2D image.
Figure 3B:
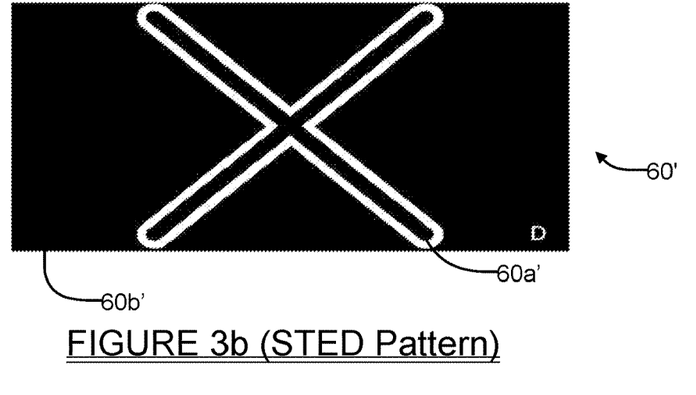
FIG. 3b is another example of an optical pattern in which an optical signal having a different frequency is selectively used to form a different 2D image, which is applied immediately after the 2D image shown in FIG. 3a, to cause stimulated emission depletion of the polymerization species and thus to stop the polymerization process, thus enhancing the resolution of details of the 2D material layer just formed.

FIGS. 2a and 3a shows two images used during formation of a single layer of a 3D part or structure. Images 2a and 3a represent the primary images 50 and 60, where each white portion 50a and 60a represents light that impinges (i.e., illuminates) the photoresin 24 in the photoresin bath 24a, and thus causes polymerization of those illuminated portions of the photoresin to form a solid. The black portions 50b and 60b represent areas which are "negative", meaning that no light from the 2D image falls on these areas, and thus no polymerization occurs on the photoresin 24 in these areas. Images 50' and 60' in FIGS. 2b and 3b, respectively, represent the secondary (i.e., "counter" or "inverse") 2D images relative to the primary images 50 and 60, respectively, shown in FIGS. 2a and 3a. In FIGS. 2b and 3b the white areas 50a' and 60a' are parts of the 2D image created by the secondary (i.e., anti-polymerization) beam 18c1 generated by the second light source 18c of the beam delivery subsystem 18, when used in connection with the spatial light modulator 14 and the digital mask 16. These white areas 50a' and 60a' will cause stimulated emission depletion of the polymerization species of the photoresin 24 that are illuminated by the beams 50a and 60a. Areas 50b' and 60b' are the negative areas of the secondary 2D images 50' and 60', and do not have any effect on the photoresin 24. The secondary 2D image 19b maintains sharp features of the primary 2D image 19a by limiting diffusion of the polymerization species around the perimeter edges and areas being formed with the primary 2D image 19a.

Figure 4:
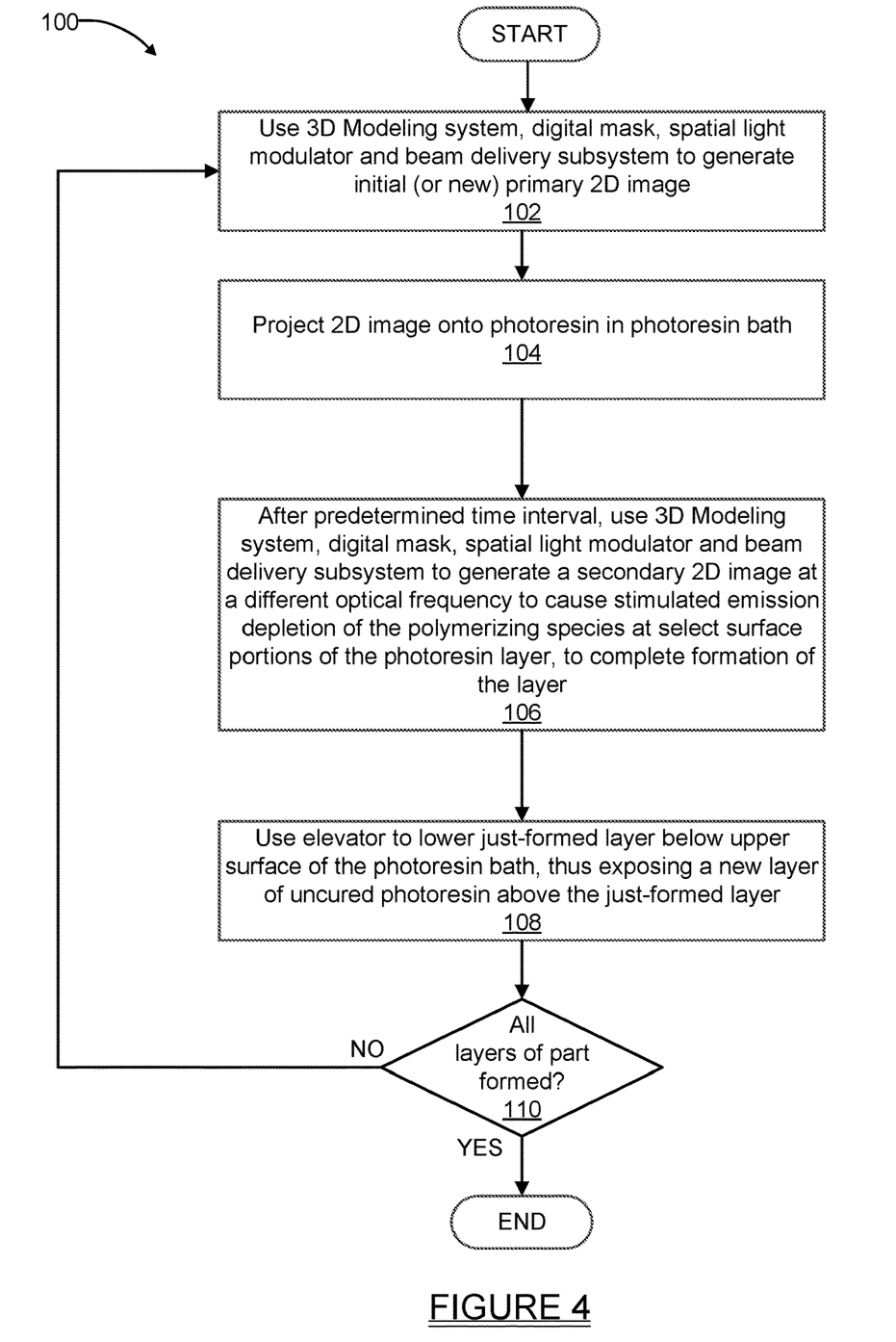
FIG. 4 is a high level flowchart setting forth various operations performed by the system shown in FIG. 1 to produce a 3D part using both stimulated emission depletion and projection microstereolithography.

Referring to FIG. 4, a high level flowchart 100 is shown which sets forth various operations performed by the system 10 in creating a high resolution 3D part or structure. At operation 102 the 3D modeling system 12, the digital mask 16, the spatial light modulator 14 and the beam delivery subsystem 18 generate the initial (or a new) primary 2D image 19a. At operation 104 the primary 2D image 19a is projected onto the surface of the photoresin 24 in the photoresin bath 24a.

As set forth in operation 106, after a given time interval, as noted above, the 3D modeling system 12, the digital mask 16, the spatial light modulator 14 and the beam delivery subsystem 18 are used to generate the secondary 2D image 19b using the secondary light source 18c, which produces an optical signal having a different wavelength from that used to create the primary 2D image. This secondary 2D image 19b causes stimulated emission depletion of the polymerization species at select portions of the photoresin layer previously activated by the primary 2D image 19a and limits the polymerization around various features that were formed (increasing the feature resolution) from the 2D layer created from the primary 2D image 19a.

At operation 108 the elevator 22 is then used to lower the just-formed 2D layer below the upper surface of the photoresin bath 24a. This exposes a new layer of uncured photoresin above the previously formed 2D. At operation 110 the system 10 makes a check to determine if all the layers of the 3D part have been formed. If this check produces a "Yes" answer, then the formation of the 3D part is complete. If the check produces a "No" answer, then operations 102-110 are repeated to form a new material layer.

The system 10 and method of the present disclosure enables 3D parts and structures to be formed with significantly improved resolution of small structural features, and more rapidly than with previous STED/PUSL processes. This is in part because the stimulated emission depletion (STED) phase of operation employed with the system 10 and method involves a complete secondary, 2D image 19b to be generated, which causes stimulated emission depletion of various subportions of the just-formed layer simultaneously, rather than through a conventional raster scanning of the beam which is causing the stimulated emission depletion of the polymerization species. This enables each layer to be fully formed much more rapidly than with conventional STED/PUSL processes.

The STED approach can benefit holographic lithography systems as well. In holographic lithography, an SLM operating in a phase-only configuration is used to apply a dynamic phase pattern to a coherent light field, such as that from a laser. The phase-controlled light is then projected using an optical system, and the resulting intensity pattern is derived from the Fourier transform of the phase-patterned complex light field on the SLM. Holographic techniques are particularly suitable for reconstructing 3D information. Holography enables volume-at-once fabrication, without requiring layer-by-layer methods. However, a major remaining challenge in holographic light field patterning is attaining high pattern resolution along all directions, which is where the STED approach may be particularly beneficial. For instance, using laser sources of two different wavelengths, one SLM may be used to holographically project the primary pattern to be polymerized, while a second SLM projects the secondary depletion/inhibition pattern, ideally from an orthogonal direction. The patterns and optical geometry can be designed for significant resolution enhancement within the 3D volume.

Another iteration of the invention may include a fluidic device, whereby photoresin is actively pumped in or out. Parts may be generated in the resin within the fluidic system, while the photoresin is being actively pumped or stationary. The generated parts are subsequently removed by the fluidic system allowing rapid generation of parts using STED projection or interference lithography.

Another iteration of the invention may have a fluidic system to actively remove photoresin of one or various compositions to allow multi-material fabrication of parts.

Another iteration of the invention may have a mechanical system whereby highly viscous resins are applied. These iterations may include but aren't limited to a wiper blade type mechanism or fluidic system in order to distribute the viscous resin before patterning.

Another iteration of the invention may include infrared or thermal light sources in order to initiate polymerization and/or heat the resin. Heating the resin can help drive polymerization to completion of various resins including but not limited to epoxies and cyanate esters.

Another iteration of the invention may include one or multiple galvo mirrors for scanning of the patterned primary and secondary SLM beams over an area.

Another iteration may include a membrane at the point of polymerization creating an air/resin interface and oxygen depletion zone.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for forming a three dimensional (3D) part, the system comprising:
   an electronic controller;
   a digital mask subsystem including a plurality of individually electronically addressable pixels;
   a beam delivery subsystem responsive to the electronic controller for generating optical signals; the beam delivery subsystem including:
      a first light source for generating a first optical signal;
      a second light source independent of the first light source for generating a second optical signal;
      a beam splitter for receiving both of the first and second optical signals, the first optical signal travelling through the beam splitter in a first direction and being used to help generate optical initiation images, and the second optical signal being used to help generate optical inhibition images; the beam splitter directing both of the first and second optical signals to the digital mask subsystem;
   the electronic controller configured to control the digital mask subsystem to receive both of the first and second optical signals and to create optical images therefrom, in response to signals from the electronic controller, the optical images forming both optical initiation images and optical inhibition images generated in alternating fashion, which transmitted back through the beam splitter in a second direction opposite to the first direction;
   wherein at least one of the optical initiation images being generated by the digital mask subsystem for a first predetermined time period and enabling activation of a polymerization species of a photo-sensitive resin in accordance with illuminated areas thereof, to thus cause polymerization of select portions of the photo-sensitive resin to help form a layer, having a predetermined depth, of the 3D part;
   wherein at least one of the optical inhibition images being generated by the digital mask subsystem and forming a negative of the at least one of the optical initiation images, and being projected for a second predetermined time period, subsequent to the first predetermined time period, and within the predetermined depth of the same layer as the at least one of the optical initiation images was previously projected, and enabling stimulated emission depletion of select subportions of the polymerization species within the predetermined depth of the same layer, over various areas of the predetermined depth of the same layer that received the one of the optical initiation images, where the select subportions define areas previously illuminated using the at least one of the optical initiation images, to enhance resolution of at least one of the select portions of the photo-sensitive resin within the predetermined depth of the same layer;
   wherein the at least one of the optical initiation images forms a primary 2D image, and the at least one of the optical inhibition images forms a secondary 2D image, and where the primary 2D image and the secondary 2D image differ from one another and are created by the digital mask subsystem in alternating fashion, both in the predetermined depth of the same layer, to form each layer of the 3D part; and
   wherein the primary 2D image and the secondary 2D image are both projected into an upper surface of the photo-sensitive resin.

2. The system of claim 1, wherein the digital mask subsystem further includes a spatial light modulator for modulating the optical signals received from the beam delivery subsystem.

3. The system of claim 1, further comprising a 3D computer aided design (CAD) modeling system for supplying a 3D model of a part to the digital mask subsystem.

4. The system of claim 1, wherein the photo-sensitive resin comprises a photo-sensitive resin bath.

5. The system of claim 4, further comprising an elevator for elevationally adjusting a position of a fully formed 2D layer made from cured and uncured portions of the photo-sensitive resin deeper in the photo-sensitive resin bath so that a new quantity of uncured photo-sensitive resin is present on the fully formed 2D layer, so that a subsequent fully formed 2D layer may be created.

6. The system of claim 1, further comprising a projection lens for scaling the at least one of the optical initiation images and the at least one of the optical inhibition images in accordance with selected dimensions for the 3D part.

7. A system for forming a three dimensional (3D) part, the system comprising:
   a first electronic controller;
   a digital mask subsystem having a plurality of electronically individually addressable pixels;
   a 3D model in communication with the first electronic controller;
   a beam delivery subsystem responsive to the first electronic controller for generating first and second optical signals, the beam delivery subsystem including;
      a first light source for generating a first optical signal;
      a second light source for generating a second optical signal;
      a beam splitter for receiving the first and second optical signals and directing the first and second optical signals in a first direction toward the digital mask subsystem;
      the beam splitter further configured to receive the first and second optical signals from the digital mask subsystem and to direct the first and second optical signals in a second direction therethrough towards the digital mask subsystem; and
   a beam delivery electronic controller in communication with the first electronic controller, and configured to control the first and second light sources;
   the first electronic controller configured to control the digital mask subsystem to receive the first and second optical signals from the beam splitter, and the 3D model, and to create from the 3D model and the first optical signal a primary 2D image, the primary 2D image being transmitted through the beam splitter in a second direction opposite to the first direction, and generated for a first predetermined time period and causing activation of a polymerization species of a photo-sensitive resin in accordance with illuminated areas of the primary 2D image, to thus cause polymerization of select portions of the photo-sensitive resin, within a predetermined depth of the photo-sensitive resin, to initiate formation of a first layer of the 3D part;

the first electronic controller further configured to control the digital mask subsystem to receive at least one of the second optical signals and to create therefrom a secondary 2D image, the secondary 2D image being projected through the beam splitter in the second direction, and for a second predetermined time period, the secondary 2D image being a negative of the primary 2D image, and which is projected in the same predetermined depth of the photo-sensitive resin, as the primary 2D image, and which initiates stimulated emission depletion of select subportions of the polymerization species within the same predetermined depth as the primary 2D image, over at least portions of the first layer, where the select subportions defined by the secondary 2D image were previously illuminated using the primary 2D image, to enhance resolution of one or more select portions of the photo-sensitive resin in the same predetermined depth;

wherein the primary 2D image and the secondary 2D image differ from one another and are created in alternating fashion using the digital mask subsystem to form each layer of the 3D part; and wherein the primary 2D image and the secondary 2D image are both projected into an upper surface of the photo-sensitive resin.

8. The system of claim 7, further comprising:

a spatial light modulator responsive to the electronic controller; and the digital mask subsystem and the spatial light modulator cooperating to create the primary and secondary 2D images from the first and second optical signals, respectively.

\* \* \* \* \*